Nov. 11, 1958   R. N. STEELE   2,860,021
TRAY ATTACHMENT FOR AUTOMOBILES AND THE LIKE
Filed Oct. 18, 1957
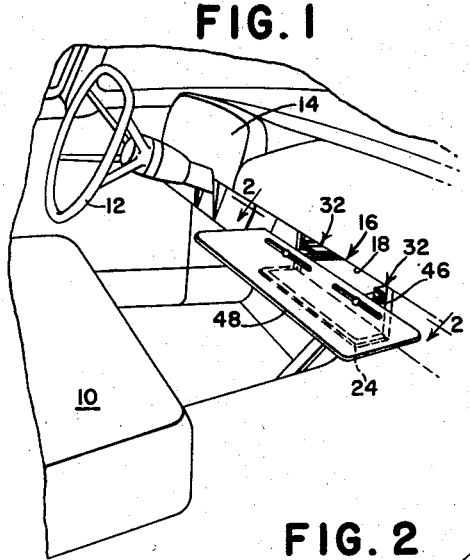
FIG. 1
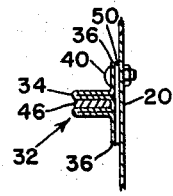
FIG. 3
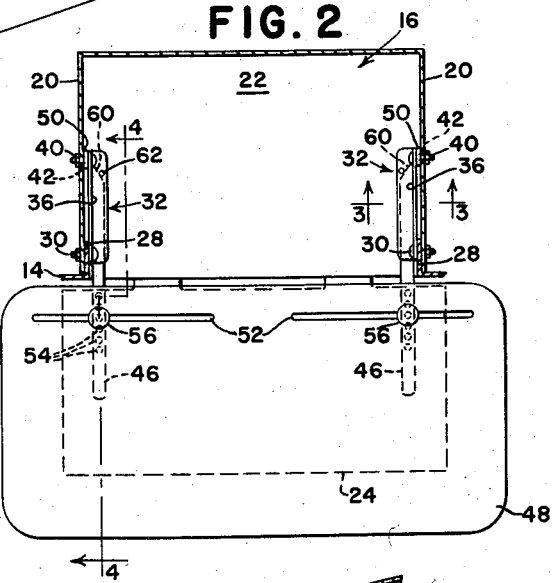
FIG. 2
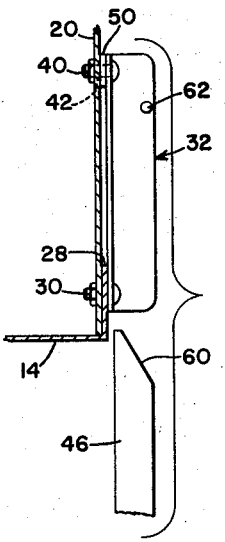
FIG. 5
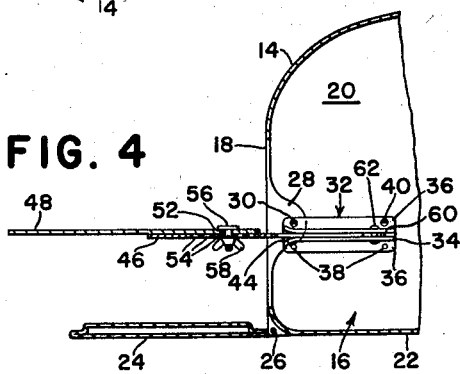
FIG. 4
INVENTOR.
R. N. STEELE
ATTORNEY

United States Patent Office 2,860,021
Patented Nov. 11, 1958

2,860,021

TRAY ATTACHMENT FOR AUTOMOBILES AND THE LIKE

Ray N. Steele, Cedar Rapids, Iowa

Application October 18, 1957, Serial No. 691,086

4 Claims. (Cl. 311—21)

This invention relates to an attachment for motor vehicles and the like and more particularly to a novel tray element mountable at and dismountable from the vehicle instrument panel at the conventional so-called glove compartment with the compartment door open.

The structure finds particular utility as a tray for supporting food and drink to front seat passengers at a drive-in or similar establishment and is especially convenient for the rider next to the driver because, in the usual drive-in, service is effected and the conventional drive-in tray is mounted at the driver's window.

A significant object of the invention is to provide the tray as an attachment that the automobile owner may purchase for use at his own convenience, as distinguished from an article furnished temporarily at the drive-in; although, the attachment may of course be sold or furnished in the first instance by the drive-in to complement its services, which is not, however, intended to limit the sources of manufacture and distribution. The design includes means whereby the tray may be supported at the instrument panel, conveniently to the driver's seat, with the glove compartment door open, and to this end features mounting means carried wholly within the glove compartment and thus exposed only when the compartment door is open. The mounting means are relatively small in size and occupy but a negligible portion of the usable space in the compartment, and, when the compartment door is open, separably receive support means on a tray that is thus temporarily carried exteriorly of the compartment for its intended use. When not so used, the tray is detached and may be stored in any convenient place, as under the front seat.

The invention features the aforesaid mounting means carried interiorly of the glove compartment so as to require no special external mounting, thus eliminating complicated installation, marring of the panel finish, etc.; a lightweight and inexpensive construction; provision for universal adjustment of the tray support means relative to the tray so as to adapt the attachment to a wide variety of automobiles; interlocking means for stabilizing the mounted tray against lateral displacement; mounting or support-receiving means of channel construction to slidably and separably receive the support means; and in general a simple and inexpensive design that may be economically mass-produced for sale to motorists at a relatively low price.

The foregoing and other important objects and desirable features inherent in and encompassed by the invention will become apparent as a preferred embodiment thereof is disclosed in detail in the ensuing description and accompanying drawing, the several figures of which are described below.

Figure 1 is a perspective showing the front interior of a motor vehicle with the detachable tray in place.

Figure 2 is an enlarged section on the line 2—2 of Figure 1.

Figure 3 is an enlarged section on the line 3—3 of Figure 2.

Figure 4 is an enlarged section on the line 4—4 of Figure 2.

Figure 5 is a fragmentary exploded view showing the separability of one guide or support-receiving means and an associated support.

The illustration in Figure 1 is based on a current popular design of automobile but the invention comprehends use thereof in other and even future designs in which, for example, the type and location of the typical glove compartment may change. Likewise, the tray is useful of course in vehicles other than autos, such as motor trucks and other vehicles in which food and drink service such as that offered by the present day drive-in is or may become commonplace. Reference to the tray as such is a convenience for purposes of description, for the element may serve also as a map shelf, table, desk, etc. and the word "tray" may thus be replaced by a word or words of equivalent connotation.

Figure 1 shows that the vehicle has, to the extent material here, a driver's seat 10, steering wheel 12 and transverse instrument panel 14, all of which is or may be conventional. The panel 14 has a typical glove compartment 16, here at the usual right hand location, although it may be centrally or otherwise disposed. Access to the compartment is had from the driver's seat through an opening 18 from opposite sides of which laterally spaced apart upright walls 20 extend forwardly as part of the usual box or wall means that defines the compartment, here shown as also including a floor or bottom 22 and typically constructed of paperboard or the like. The compartment opening 18 is selectively covered and uncovered by a door 24, here shown as being hinged at its bottom at 26 to a lower part of the panel that defines the lower rear portion of the compartment.

At this point it should be observed that the expressions "front" and "rear" and "right" and "left" are used with reference to a person seated on the seat 10. Thus "forward" means away from or ahead of such person and "rearward" means toward such person or toward the seat 10.

In typical panel and compartment construction, the panel has laterally spaced apart forwardly extending flanges or ears 28 (Figures 2 and 4), either as part of the panel or as a secondary structure for supporting the compartment box or wall means 20—22. These ears respectively overlie rear portions of the walls 20 and each ear has one or more bolts or screws 30 closely adjacent to the compartment opening 18 but wholly interiorly of the compartment so as to be concealed when the compartment door 24 is closed. According to the present invention, these screws or fasteners are temporarily removed and then replaced so as to be used in the mounting of support-receiving means, here a pair of elongated fore-and-aft guide channels 32. Each guide has a central channel portion 34 flanked by upper and lower wings or flanges 36 (Figure 3) apertured at 38 (Figure 4) to afford means for cooperation with the respective bolts or screws 30 and other fasteners, to be described, in mounting the channels in place respectively on the interior faces of the compartment walls 20 so that the channels are transversely and horizontally alined and so that their open sides preferably face laterally inwardly.

The other fasteners, referred to generally above, are here shown as a pair of bolts 40 in addition to the bolts or screws 30, and each of these bolts 40 is received in a forward one of the apertures 38 in a channel wing 36 and is passed through an aperture 42 punched or otherwise formed in the associated compartment wall 20. It will be understood of course that each screw 30 is removed and then replaced through a rear channel aperture 38 and that the holes 42 in the compartment walls 20 are punched or made as part of the installation of the channels. It will be further understood that although each guide channel is here shown as having four apertures 38, the apertures in addition to the two preferably used in the installation are provided merely as part of the adaptation of the means to a variety of sizes and styles of glove compartments. Any number of apertures that will accomplish the mounting may be used. Likewise, although each guide channel 32 is shown as being preferably of one-piece form, appropriately shaped as illustrated, it could be of three-piece construction soldered or brazed to afford the central channel portion 34 and flanking wings or flanges 36, or any equivalent construction may be resorted to. Further, the guide channels are identical so that there are no lefts and rights.

The rear portion of each guide channel—or that portion exposed through the uncovered compartment opening 18—is flared as a mouth or entry portion 44 to facilitate receipt by the channels of a pair of supports or fingers 46 forming support means on a tray or tray element 48. These fingers are mounted on the tray in laterally spaced apart relation on the order of the spacing of the channels and when received respectively by the channels serve to mount the tray in a transverse horizontal position convenient to the driver's seat 10.

From the description thus far it will be seen that the attachment comprises two basic components. One is internal and is made up of the mounting channels or support-receiving means 32 permanently (although detachably) mounted wholly within the compartment 16. The other is external to the compartment and is made up of the tray 48 and support fingers 46 and is mountable on or dismountable from the support means 32 when the compartment door 24 is open. When the tray is detached, the support fingers of course remain with it, and the door 24 can be opened and closed as if the attachment were not present. The channels 32 are relatively narrow and the space they occupy in the compartment is negligible.

As a further part of that phase of the inventions adapting the attachment as a single design for a wide variety of types and sizes of glove compartments, the support fingers 46 are adjustable both fore-and-aft and laterally relative to the tray 48 and are further mounted for arrangement in parallelism to each other as well as for deviation from such parallelism. For example, in the mounting of the channels 32 on the walls 20 of the compartment, the intervention of the panel flanges or ears 28 may cause forward divergence of the channels, which may be overcome where necessary by the use of spacers such as shown at 50 (Figure 2). On the other hand, many glove compartment walls, as at 20 here, converge slightly forwardly and although spacers may not then be required in mounting the channels the convergence will mean that the channels themselves will converge. Hence the provision for arranging the support fingers 46 also in comparable convergent relation to mate with the channels. This feature is described below.

The tray has a pair of alined transverse slots 52 (Figure 2) and each finger has at its rear portion a plurality of fore-and-aft spaced apart holes 54 (Figures 3 and 4). A pivotal fastener in the form of a headed screw 56 is passed through each slot 52 and through a selected hole 54 in the associated finger 46 and a wing nut 58 completes each assembly. When the wing nuts are loosened, the screws may be adjusted laterally of the tray by moving the bolts 56 lengthwise of the slots 52, carrying the fingers 46 with them and thus varying the lateral spacing of the fingers. Also, the spacing may be retained and the fingers may be turned about the pivots afforded by the screws 56 so as to be adjusted for parallelism or forward convergence. The tightened wing nuts of course retain the selected adjustment.

Fore-and-aft adjustment of the fingers is achieved by temporarily removing the fingers and reinstalling same at different positions according to a change in holes 54. If desired, a slot could be substituted for each set of holes 54. The fingers 46 are identical to avoid lefts and rights.

Another feature of the invention is the releasable interlock between the fingers 46 and the guide channels 32, which functions to laterally stabilize the mounted tray. This means, as between each channel and its received finger, comprises a tapered front end portion 60 on the finger and a pin 62 vertically through the channel. A wedging action occurs between the two when the finger is fully forwardly seated and these means at both sides of the unit combine to prevent possible shifting of the tray in the event that the pivotal connections at 56—58 become inadvertently loose enough to permit pivoting of the fingers. Another feature of this phase of the design is that it enables the use of the more economical channels instead of costlier tubes for support receivers. Further, when the tapered ends 60 are forwardly seated, a forward stop is afforded, preventing the tray from striking and perhaps marring the panel 14.

As will be seen, the tray is forwardly and slidably received by the channels for mounting and is rearwardly separable by sliding same rearwardly. When in place, the tray overlies the compartment door 24 and the door is not in the way. When the tray is removed, the door may be closed and the support receivers or channels are concealed and the compartment 16 retains its original uses and functions. It is also feasible, when the tray is dismounted, to use the channels for other purposes, such as supporting a shelf within the compartment, etc.

The foregoing and other features have been detailed in the description and others will readily occur to those versed in the art, in addition to which modifications and alterations of the presently preferred embodiment will suggest themselves, all without departure from the spirit and scope of the invention.

What is claimed is:

1. For use in a vehicle having a driver's seat and a transverse instrument panel having a glove compartment defined in part by a pair of laterally spaced apart upright walls extending forwardly respectively from opposite sides of an access opening that is selectively covered and uncovered by a hinged door: an attachment comprising a pair of fore-and-aft elongated guide channels respectively having means for the affixation thereof respectively to the compartment wall generally in horizontal transverse alinement and located wholly within the compartment so as to be rearwardly exposed through the uncovered compartment opening; a tray element positionable horizontally at the driver's seat side of the instrument panel and normally outside the compartment with the compartment door open; a pair of supports spaced laterally apart generally on the order of the lateral spacing of the guide channels and extending forwardly from the tray element and respectively slidably receivable forwardly in said channels to mount the tray element in cantilever fashion and slidably separable rearwardly from said channels to dismount the tray element; and a pair of means mounting the supports on the tray element for lateral adjustment relative to the tray and relative to each other, at least one of said means further including provision for enabling one support to lie selectively parallel to or non-parallel with the other support to respectively accommodate parallel or non-parallel conditions of the walls of the glove compartment.

2. The invention defined in claim 1, in which: each support has a tapered front end portion receivable in the channels, each channel has its open side facing laterally toward the interior of the compartment, and each channel has at a forward portion thereof a locking part receiving the tapered front end portion of the associated support so as to stabilize the supports against lateral shifting relative to the channels.

3. The invention defined in claim 1, in which: each mounting means includes transverse slot means in the tray and a pivot member carried by said support and adjustable lengthwise of the support and transversely of the tray to enable both variation in the lateral spacing of the supports and deviation of the supports from parallelism as respects each other.

4. For use in a vehicle having a driver's seat and a transverse instrument panel having a glove compartment defined in part by a pair of laterally spaced apart upright walls extending forwardly respectively from opposite sides of an access opening that is selectively covered and uncovered by a hinged door: an attachment comprising a pair of support receivers respectively having means for the affixation thereof respectively to the compartment walls generally in horizontal transverse alinement and located wholly within the compartment so as to be rearwardly exposed through the uncovered compartment opening; a tray element positionable horizontally at the driver's seat side of the instrument panel with the compartment door open; and a pair of supports on the tray element and spaced laterally apart on the order of the lateral spacing of the guide channels, said supports extending forwardly from the tray element and receivable by said support receivers to mount the tray element in cantilever fashion free of the open glove compartment door, said supports being separable from the channels to dismount the tray wholly from said compartment.

References Cited in the file of this patent

UNITED STATES PATENTS

| | | |
|---|---|---|
| 1,398,496 | Saltalamachia | Nov. 29, 1921 |
| 1,563,864 | Juvet | Dec. 1, 1925 |
| 2,275,060 | Griffin | Mar. 3, 1942 |
| 2,584,557 | Cuthberson | Feb. 5, 1952 |
| 2,588,844 | Jones et al. | Mar. 11, 1952 |
| 2,657,967 | Gilchrist | Nov. 3, 1953 |